United States Patent [19]

Stoehr

[11] 4,394,829
[45] Jul. 26, 1983

[54] FLYING SHEAR FOR METAL STRIP STOCK
[75] Inventor: Herbert M. Stoehr, New Berlin, Wis.
[73] Assignee: Artos Engineering Company, New Berlin, Wis.
[21] Appl. No.: 310,620
[22] Filed: Oct. 13, 1981
[51] Int. Cl.³ ............................................. B26D 1/00
[52] U.S. Cl. ..................................... 83/314; 83/320; 83/387
[58] Field of Search ................ 83/314, 318, 319, 320, 83/294, 37, 378, 382, 386, 387, 389

[56] References Cited
U.S. PATENT DOCUMENTS

| | | | |
|---|---|---|---|
| 1,417,609 | 5/1922 | Koerner | 83/387 |
| 3,516,313 | 6/1970 | Gudmestad | 83/110 |
| 3,566,728 | 3/1971 | Ohmasu | 83/319 |
| 3,803,966 | 4/1974 | Plegat | 83/294 |

Primary Examiner—Robert E. Garrett
Assistant Examiner—Hien H. Phan
Attorney, Agent, or Firm—James E. Nilles

[57] ABSTRACT

In a flying shear wherein strip stock moves lengthwise forward, a lower blade carrier, confined to forward and backward motion, has an upwardly facing clamping surface and carries a lower shearing blade. An upper blade carrier, connected with the lower one for back and forth motion with it and for up and down motion relative to it, carries an upper shearing blade and is biased to a raised position. A gripper, connected to the lower blade carrier to swing about an axis spaced substantially above said clamping surface, has a bottom wedging surface curved eccentrically to said axis. The gripper is biased forward, for engagement of its said surface against strip stock whereby the strip stock is clamped to the clamping surface and pulls the blade carriers forward. There is a lost motion connection between the gripper and the upper blade carrier whereby the latter can descend independently of the gripper but whereby rise of the upper blade carrier to its raised position draws the gripper to a position in which its wedging surface is above the strip. For shearing, the upper blade carrier is driven down by an actuator at a fixed location above the blade carriers.

9 Claims, 9 Drawing Figures

FLYING SHEAR FOR METAL STRIP STOCK

FIELD OF THE INVENTION

This invention relates to shearing apparatus whereby metal strip stock is cut into pieces of uniform length, and the invention is more particularly concerned with a so-called flying shear whereby successive transverse cuts are made through a metal strip while the strip continues in lengthwise forward motion.

BACKGROUND OF THE PRIOR ART

A flying shear is employed for rapidly cutting a long metal strip into uniform lengths. Such a shear affords fast, efficient production because the strip remains in continuous forward lengthwise motion while the shear operates, without the delays that would be involved in stopping the strip for each cut and resuming its advance after the cut is made. However, in order to cut cleanly through the metal, the shearing blades that sever the strip must be moving forwardly in accurate unison with the strip from the time they first engage it until severing is completed.

In general, a flying shear of the type to which this invention relates comprises a blade carrier assembly which is movable back and forth through a limited distance and which carries a lower shearing blade that is fixed against vertical motion relative to the strip and an upper vertically movable shearing blade that cooperates with the lower blade. During cutting, the blade carrier assembly is caused to move forwardly with the strip while the upper blade is forced downwardly to shear through the metal. Upon completion of the cut, the blade carrier assembly moves rearward, back to a starting position, while the upper blade rises to a retracted position spaced above the advancing remainder of the strip.

Heretofore various types of hydraulic, pneumatic and mechanical actuators have been devised for imparting the necessary forward and rearward movement to the blade carrier assembly. In each case the actuator was relatively complicated and expensive because it was required to accelerate the carrier assembly rapidly from a stop to the forward speed of the strip, maintain the carrier assembly at strip speed while the upper blade remained in engagement with the metal, and then quickly decelerate the assembly and return it to its starting position. The actuator had to start the carrier assembly in forward motion upon receipt of an impulse from a microswitch or similar sensor that was adjustably positioned along the path of strip travel, forward of the carrier assembly, to be actuated by the leading edge of the strip. Usually the actuator that effected horizontal propulsion of the carrier assembly had to be supplemented by a further actuator that drove the upper shearing blade for its vertical cutting and retracting movements. The shearing blade actuator added further complication and expense to the complexity and cost of the horizontal actuator, especially in view of the need for synchronizing its vertical motion with operation of the horizontal actuator.

U.S. Pat. No. 3,516,313 to R. Gudmestad disclosed a flying shear mechanism wherein the blade carrier assembly was moved forwardly and rearwardly by a mechanical transmission connected with the drive for forward propulsion of the strip. This transmission also drove the upper shearing blade for its up and down movement. To accomplish the horizontal and vertical actuating movements in proper synchronism with one another and with forward advance of the strip, the mechanism of the Gudmestad patent comprised a specialized single-revolution type clutch, an eccentric crank mechanism and a number of links and other motion-transmitting and motion transforming elements.

An expressly stated object of the invention of the Gudmestad patent was to provide a flying shear that was not only fast and efficient but was "extremely simple, compact and durable in construction." As compared with most prior flying shear mechanisms, that of the Gudmestad patent was rightly characterized as extremely simple, and until the present invention was made it represented an advanced state of the art. Nevertheless, its mechanism was not truly simple, nor was it inexpensive.

SUMMARY OF THE INVENTION

The general object of the present invention is to provide a flying shear whereby transverse cuts through a metal strip can be made at regular lengthwise intervals while the strip is in continuous forward motion, which flying shear is much less complicated and expensive than prior apparatus intended for the same purpose but is nevertheless very accurate and capable of cooperation with strip stock of any of a wide range of widths and thicknesses.

Another and more specific object of this invention is to provide a simple, compact and inexpensive flying shear having a blade carrier assembly which is positively constrained to forward movement with the strip during the cutting operation but which nevertheless has a single extremely simple actuator—essentially merely a pneumatic cylinder jack or the like—that is responsible for effecting both forward motion of the blade carrier assembly and downward cutting motion of the upper shearing blade.

A further object of the invention is to provide an extremely simple, inexpensive and compact flying shear having a shearing blade carrier assembly that literally locks itself to the strip stock during the cutting operation, to be thus constrained to move at exactly the speed of the strip, thereby ensuring a clean, precise cut.

Another specific object of the invention is to provide a flying shear wherein the shearing blade carrier assembly is so arranged that during a cutting operation, when the assembly is moving forwardly with the strip, the lower shearing blade follows a true horizontal path exactly parallel to the path of forward movement of the strip, so that neither one of the shearing blades imposes any flatwise bowing force upon the strip.

In general, these and other objects of the invention that will appear as the description proceeds are achieved in apparatus wherein metal strip stock is constrained to move in a forward direction with its lower surface on a horizontal plane. A lower blade carrier, having an upwardly projecting lower shearing blade fixed thereon, is confined to motion in said forward direction and in the opposite rearward direction, with the cutting edge of said shearing blade substantially on said plane. A horizontal biasing means urges the lower blade carrier rearwardly towards a normal position. A downwardly projecting upper shearing blade, cooperable with the lower shearing blade, is fixed on an upper blade carrier that is connected with the lower blade carrier for backward and forward motion with it and for up and down motion relative to it. A vertical biasing means urges the upper blade carrier towards a raised position. A gripper is connected to the lower blade carrier to swing relative to it about a transversely extending axis spaced substantially above said plane. The gripper has at its bottom a strip-engaging surface that is curved eccentrically to said axis, and it has a lost motion connection with the upper blade carrier whereby said surface is maintained well above said plane, out of engagement with a strip, while the upper blade carrier is in its raised condition. When a cut is to be made, an actuator at a fixed location above the blade carriers forces down the upper blade carrier, and as the upper blade carrier descends, a spring reacting between it and the gripper swings the latter about said axis to wedgingly engage the bottom surface of the gripper against the strip and thereby clamp the strip against a top surface on the lower blade carrier. Thus clamped to the strip, the blade carriers are compelled to move forward with it while the upper blade carrier continues its descent to carry the upper shearing blade through the strip. When forward motion carries the upper blade carrier out from under the actuator, the upper blade carrier returns to its raised position, lifting the gripper off of the strip so that the lower blade carrier can move rearwardly back to its normal position.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

In the accompanying drawings the numeral 5 designates generally a horizontally elongated stand or fixed frame structure that supports shearing apparatus 6 of this invention whereby metal strip stock S is cut through transversely, at regular lengthwise intervals, to convert it to uniform-length pieces. In front of the shearing apparatus 6 the fixed structure 5 carries a pair of draw rollers 7, which are driven for steady rotation and between which the strip stock S passes to be drawn lengthwise forwardly at a constant linear speed. Behind the shearing apparatus the fixed structure supports a pair of feed rollers 8, 8' between which the strip S passes on its way to the shearing apparatus.

For purposes of illustration, the strip stock S is shown as flat, and the draw rollers 7 and the feed rollers 8, 8' are correspondingly shown as cylindrical, but it will be understood that the strip stock could be transversely bent or curved, and the rollers 7, 8, 8' would in that case be formed to accommodate its transverse shape.

The upper feed roller 8, which is freely rotatable, normally bears down upon the strip S under a biasing force that maintains the strip in driving engagement with the lower feed roller 8'. An electric motor 9 drives the lower feed roller 8' through a speed reducing transmission 10. The feed rollers 8, 8' tend to advance the strip more slowly than it is pulled along by the draw rollers 7, but the driving transmission for the lower feed roller 8' includes an overriding clutch 12 that allows the peripheral speed of the feed rollers to match the speed at which the strip is pulled by the draw rollers 7. When the strip is cut through by the shearing apparatus 6, the draw rollers 7 will continue to advance the severed piece at the normal speed of the strip drive, while the remainder of the strip, behind the cut, will slow to the lower speed imparted by the feed roller drive 9, 10, thus allowing a gap to develop between the severed piece and the remainder of the strip.

Figure 2:
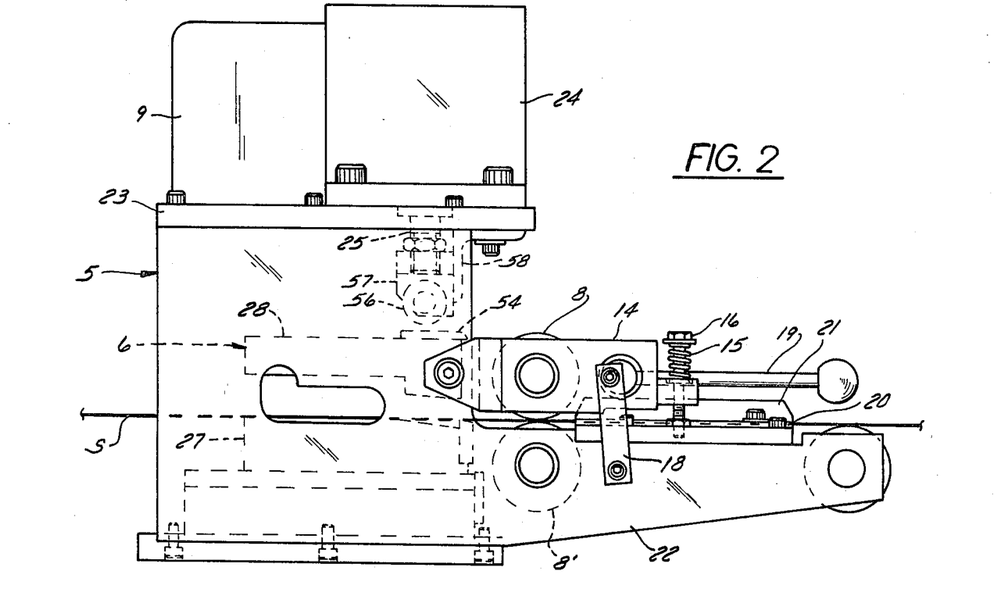
FIG. 2 is a view in side elevation of the portion of the machine that is shown in FIG. 1.

The upper feed roller 8 is carried for bodily up and down motion on rearwardly projecting arms 14, one at each side of the fixed structure 5, each pivoted to the fixed structure 5 at its forward end, as best seen in FIG. 2. Each arm 14 is biased downwardly by means of a spring 15 that surrounds an upright bolt 16. The bottom portion of each bolt 16 is threaded into the fixed structure 5, and the bolt projects up through a hole in a rear portion of its arm 14 to have its head spaced above the arm. Each spring 15 reacts between the head of its bolt 16 and the arm 14 therebeneath. A toggle linkage 18, connected between the arms 14 and the fixed structure 5, is operable by means of a hand lever 19 for raising the arms 14 to lift the upper feed roller 8 to an inoperative position spaced well above the lower feed roller 8'.

Figure 1:
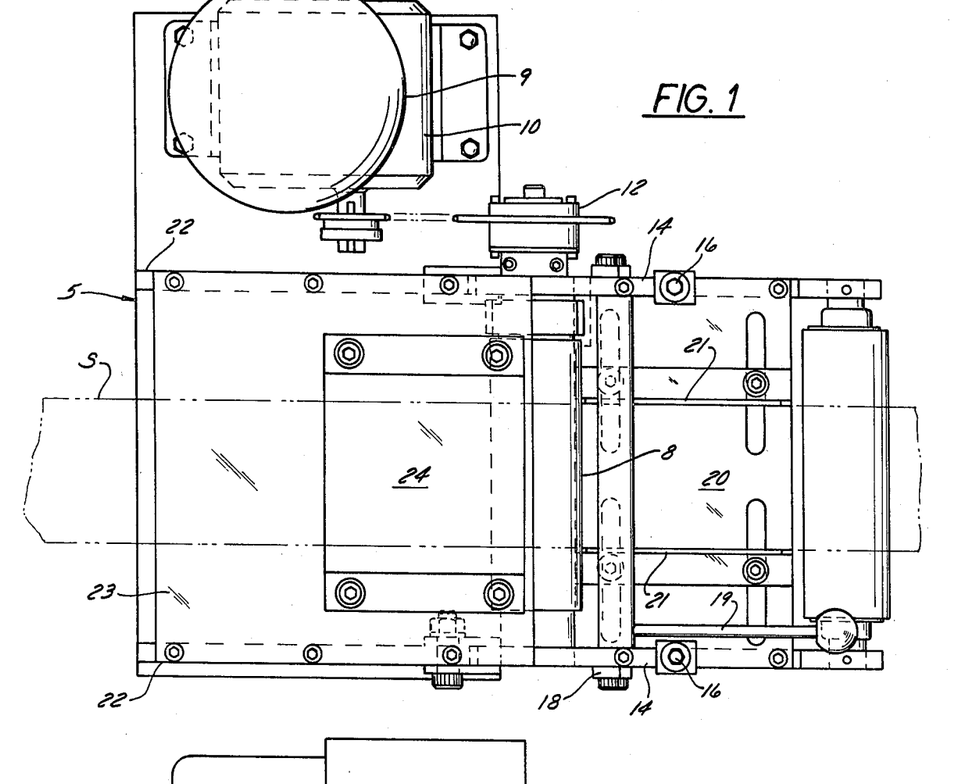
FIG. 1 is a top plan view of the portion of a metal strip shearing machine that comprises shearing apparatus embodying the principles of this invention.

A horizontal guide plate 20 on the fixed structure 5 has a top surface on which the strip S slides as it moves towards the feed rollers 8, 8'. The strip is confined to straight lengthwise motion into the nip of the feed rollers 8, 8' by upwardly projecting forwardly elongated guide abutments 21 that are laterally adjustably secured to the top surface of the guide plate 20 (as best seen in FIG. 1) to be slidingly engage by the side edges of the strip.

In front of the feed rollers 8, 8' and behind the draw rollers 7 the fixed structure S comprises upright stationary side plates 22 to which the arms 14 are pivoted and which partially enclose the shearing apparatus 6. A top plate 23 that bridges across the fixed side plates 22 supports the cylinder of a pneumatic actuator 24 whereby shearing actuation is imparted to the shearing apparatus 6 as explained hereinafter. The piston rod 25 of the actuator 24 projects down through a hole in the top plate 23.

In general, the shearing apparatus 6 comprises connected lower and upper blade carriers 27 and 28, respectively, which respectively carry a lower shearing blade 29 and an upper shearing blade 30. The lower blade carrier 27, which comprises a body 27a and bearer plates 43 as described hereinafter, is movable forwardly and rearwardly beneath the strip, while the upper blade carrier 28 is connected with the lower carrier 27 to move backward and forward with it and to move up and down relative to it. The connection 31 between the blade carriers 27, 28, as explained hereinafter, is preferably a hinged or pivotal connection, so that the blade carriers 27, 28 can be regarded as lower and upper jaw members.

The upper blade carrier 28 is biased to a normally raised position by means of springs 33 that react between it and the lower blade carrier 27. When cut is to be made, the upper blade carrier 28 is forced down from its raised position by extension of the piston rod 25 of the pneumatic actuator 24. Descent of the upper blade carrier 28 causes a gripper 35 to clampingly engage the moving strip S before the upper shearing blade 30 comes into contact with the strip. By its engagement with the strip the gripper 35 constrains the assembly comprising the carriers 27, 28 to move forward in unison with the strip while the upper blade carrier 28 continues its descent and the upper shearing blade 30 cooperates with the lower blade 29 to shear through the strip.

The lower blade carrier 27 comprises a carriage confined to sliding forward and rearward motion by gibs 36 on its bottom that cooperate with guide ways 37 on the fixed structure 5. A horizontally extending tension spring 38 is connected between the fixed structure 5 and the lower blade carrier 27 to bias the latter rearwardly towards a normal position in which it is engaged against a bumper 39 on the fixed structure. The portion of the lower blade carrier 27 that is beneath the gripper 35 has a flat top surface 40 on which the strip S flatwise slides between shearing operations and against which the strip is flatwise clamped by the gripper 35 upon descent of the upper blade carrier 28. The upwardly projecting lower shearing blade 27 is mounted on a rear portion of the lower blade carrier 27 with its cutting edge extending transversely to the length of the strip and at the level of the flat clamping surface 40. Behind that clamping surface 40 the top surface of the lower blade carrier 27 is downwardly and rearwardly inclined to provide a recess 41 in front of the lower shearing blade 29 in which the upper shearing blade 30 is receivable.

For connecting the upper blade carrier 28 and the gripper 35 with the lower blade carrier 27, there are two substantially L-shaped supporting plates 43 (FIG. 9) on the lower blade carrier, one secured to each side of its block-like body 27a, each extending edgewise upright and fore-and-aft. The rather wide upwardly projecting stem portion of each of these L-shaped plates is at its front. The body 28a of the upper blade carrier 28 is relatively thick, and through its front portion it has a transverse bore 44 in which is received the shaft 31 that connects it with the lower blade carrier 27. Each end portion of the shaft 31 is seated in a hole 45 in the upper front portion of an L-shaped plate 43. The shaft 31 thus supports the upper blade carrier 28 to swing about a hinge axis that is near the front ends of the blade carriers and is spaced substantially above the plane of the clamping surface 40 on the lower blade carrier 28. The front portion of the upper blade carrier is supported high enough above the plane of the clamping surface 40 to accommodate strip stock of any expectable thickness.

To minimize inertia, the relatively thick bodies 27a and 28a of the lower and upper blade carriers are preferably of aluminum or other light metal.

The downwardly projecting upper shearing blade 30, which cooperates with the lower shearing blade 29, is mounted on the rear portion of the upper blade carrier body 28a. It is secured to the underside of that body 28a by means of screws 46 which extend through forwardly elongated slots 46a in the body 28a and which have spherical washers 46b under their heads (FIGS. 3 and 5) so that its cutting edge can be adjusted to mate with the cutting edge of the lower shearing blade 29. For such adjustment the upper shearing blade has a forwardly projecting ledge near its bottom that defines a forwardly and downwardly inclined top wedging surface 48, and adjusting screws 49, threaded downwardly through the upper blade carrier body 28a, have conical points which engage that wedging surface.

Figure 5:
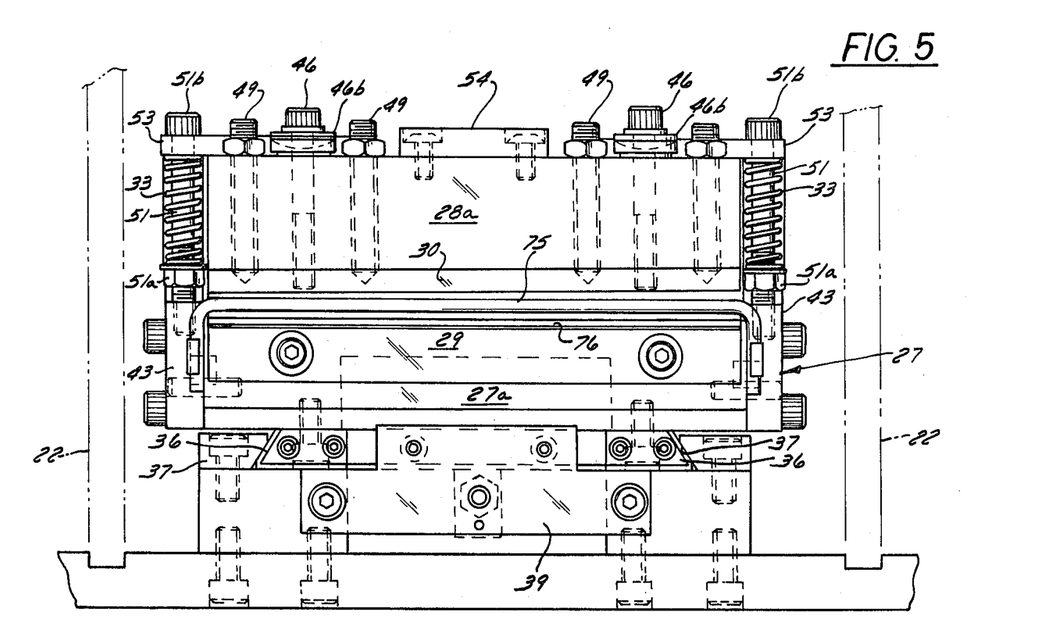
FIG. 5 is a view in end elevation, looking from the right side of FIG. 4.
Figure 8:
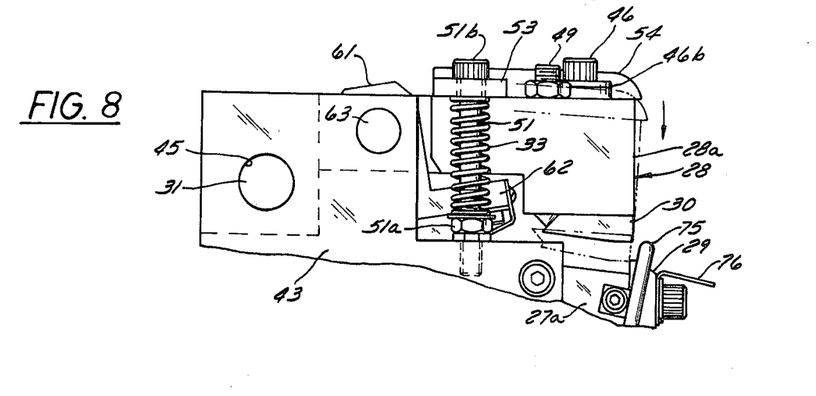
FIG. 8 is a view of the blade carrier assembly in side elevation, particularly showing the vertical biasing means whereby the upper blade carrier is urged towards its raised position.

The vertical springs 33 that bias the upper blade carrier 28 towards its normal raised position (shown in FIG. 3) are piloted on guide bolts 51, one at each side of the blade carrier assembly (FIGS. 5 and 8). Each guide bolt 51 has its bottom portion threaded into the lower blade carrier 27 and secured by a jam nut 51a upon which the lower end of its spring 33 is seated. Flatwise secured to the top of the upper blade carrier body 28a are a pair of laterally elongated abutment plates 53, each of which has an end portion projecting laterally beyond the side of said body 28a. In the projecting end portion of each abutment plate 53 there is a hole through which its guide bolt 51 projects upwardly. Each spring 33 reacts against the bottom of its abutment plate 53, biasing that plate upwardly into engagement with the head 51b on its guide bolt, which defines the raised position of the upper blade carrier 28.

On the top of the upper blade carrier 28, midway between the abutment plates 53, there is a striker plate 54 which is elongated in the forward and rearward direction and against which the pneumatic actuator piston rod 25 engages to swing the upper blade carrier downwardly for shearing through a strip. Because the pneumatic actuator 24 is in a fixed location, whereas the blade carrier assembly 27, 28 literally moves out from under the actuator during shearing, there is a roller 56 on the bottom of the actuator piston rod 25, which rides on the striker plate 54 to minimize friction between it and the piston rod. The roller 56 is connected with the piston rod 25 by means of a clevis 57 that has a flat rearwardly facing surface. Projecting downwardly from the fixed top plate 23 is a stationary guide bracket 58 (FIGS. 2 and 3) that has a flat forwardly facing surface which is slidingly engaged by the rearwardly facing surface on the clevis 57 to confine the piston rod against rotation about its own axis and thus maintain the roller axis in the proper laterally extending orientation.

The gripper 35 by which the blade carrier assembly 27, 28 is releasably locked to the moving strip as the upper blade carrier 28 begins to descend is swingably connected to the lower blade carrier 27. Specifically, it is pivoted to the upwardly projecting bearer plates 43 on the lower blade carrier 27, to swing about a gripper axis which is spaced to the rear of the hinge axis about which the upper blade carrier 28 swings and which is parallel to that hinge axis and at a level somewhat above it. On its bottom the gripper 35 has a surface 59 that is curved eccentrically to the gripper axis for engagement with strip stock therebeneath in the manner of a wedging cam. Thus the bottom surface 59 of the gripper has a radius of curvature about the gripper axis that increases towards the rear of the gripper so that as the gripper swings forward about its axis, its bottom surface comes steadily nearer to the plane of the clamping surface 40 on the lower blade carrier.

Figure 9:
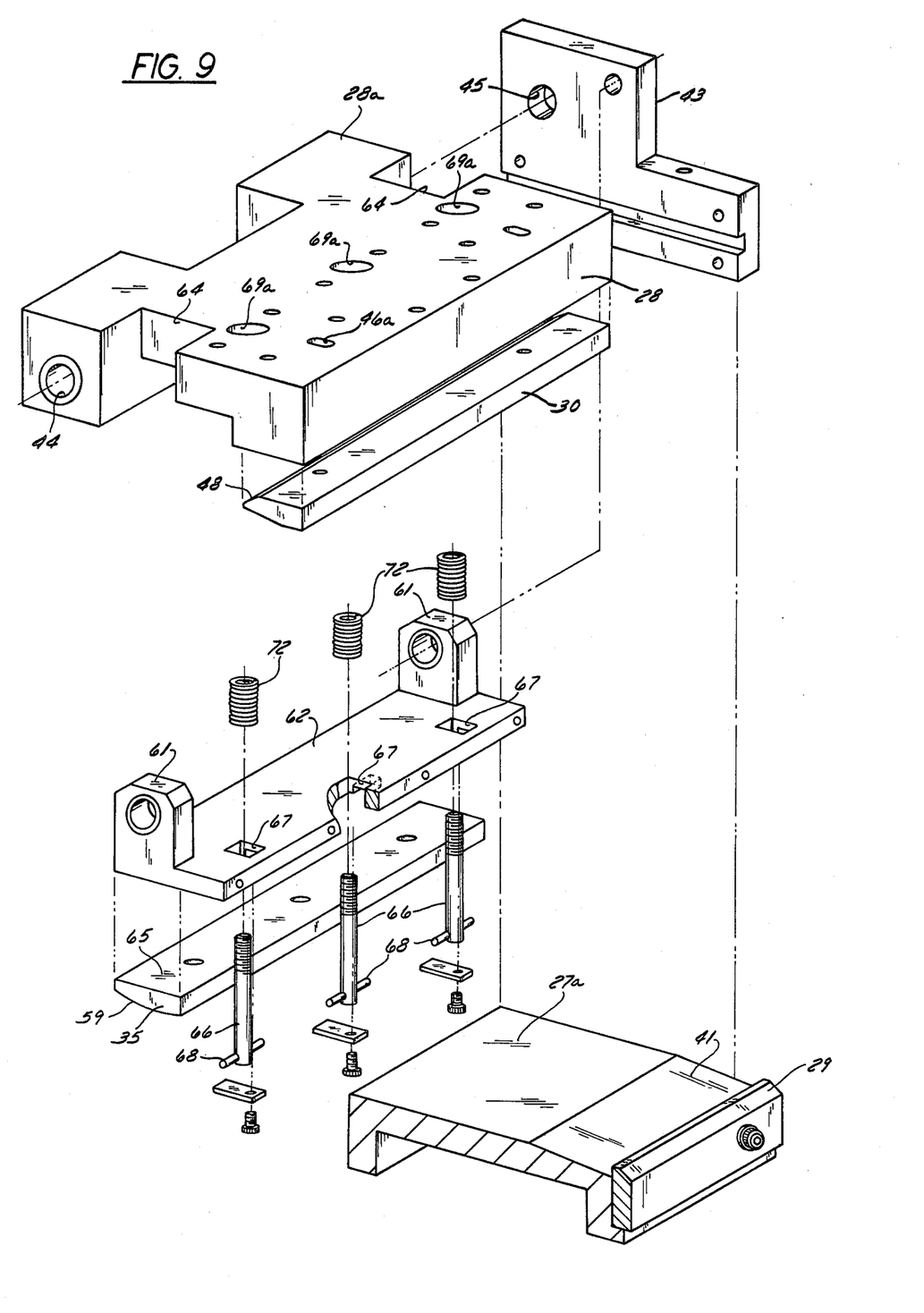
FIG. 9 is a disassembled perspective view of the upper and lower blade carriers, the gripper, and the means for controlling swinging motion of the gripper.

The gripper 35, as best seen in FIG. 9, has a more or less U-shaped body, with short legs 61 projecting upwardly from opposite ends of a transversely elongated plate-like bight portion 62. The gripper legs 61 have coaxial trunnion connections 63 with the upper portions of the bearer plates 43 that define a gripper axis about which the gripper swings. The body 28a of the upper blade carrier has sidewardly opening bays 64 in which the legs 61 are received with substantial clearance. The curved bottom surface 59 of the gripper is formed on an elongated pad 65 that is secured to the underside of the plate-like bight portion 62.

As shown, the curved bottom surface 59 on the pad 65 is straight all along its length, for cooperation with flat strip stock, but obviously the pad 65 and the clamping surface 40 could be configured for cooperation with strip stock that was bent, curved or otherwise shaped across its width, and in that case the shearing blades 29, 30 would be formed as cutting dies of appropriate configuration.

The bight portion 62 of the gripper body projects rearwardly beyond the legs 61 and the pad 65 for connections with links 66 that provide a lost motion connection between the gripper and the upper blade carrier 28. Each link 66 comprises a tie bolt that extends up through a substantially larger diameter hole 67 in the gripper. A transverse pin 68 through the bottom portion of each tie bolt 66 is received in laterally elongated grooves in the underside of the bight portion 62, at opposite sides of the hole 67, to provide a swinging connection between the tie bolt and the gripper. The upper end portions of the tie bolts project upwardly through larger diameter registering holes 69a in the body 28a of the upper blade carrier and in the plates 53 and 54 that overlie its top surface. A nut 70 on the upper end of each tie bolt 66 overlies a spherical washer 71 that rests on the plate 53 or 54 through which the tie bolt projects, to provide a swinging connection between the tie bolt and the upper blade carrier. A compression spring 72 surrounds each link 66 to react between the gripper 35 and the body 28a of the upper jaw member, biasing the gripper 35 to swing forwardly about the gripper axis.

Figure 3:
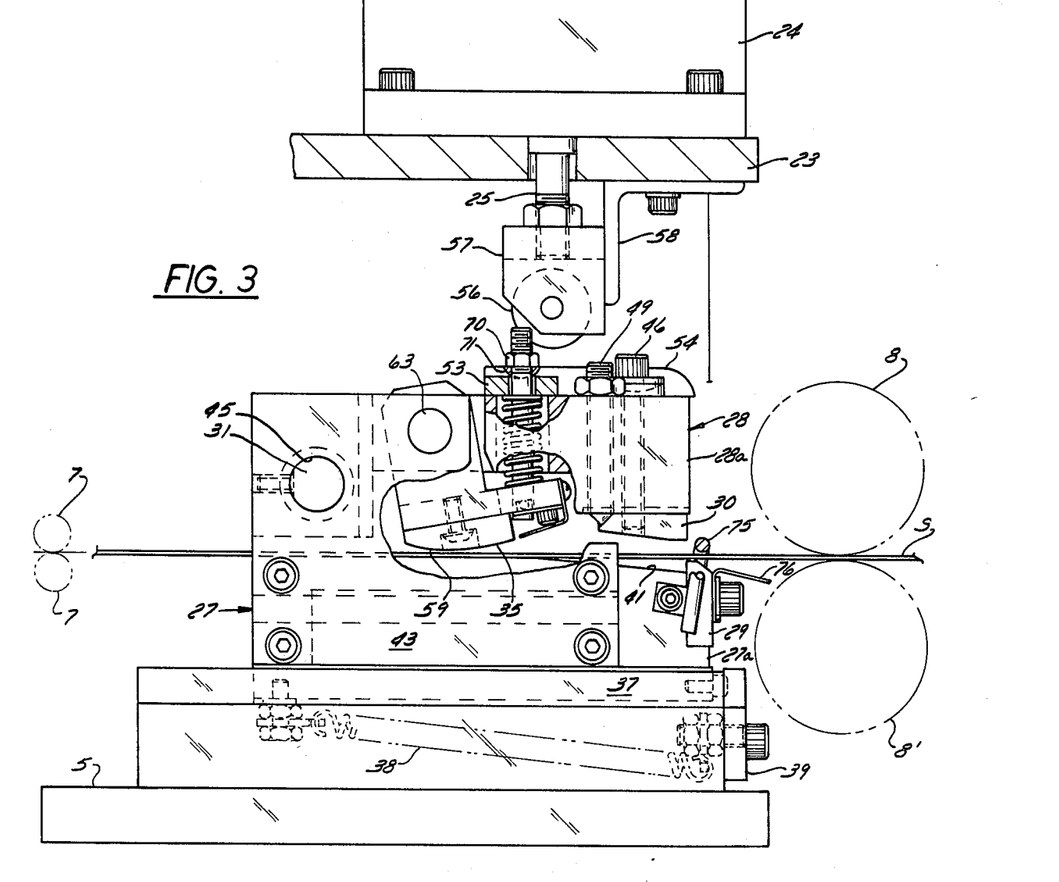
FIG. 3 is a view on a larger scale than FIGS. 1 and 2, mainly in side elevation but with portions broken away, showing the shearing apparatus itself, in its condition between shearing operations.
Figure 4:
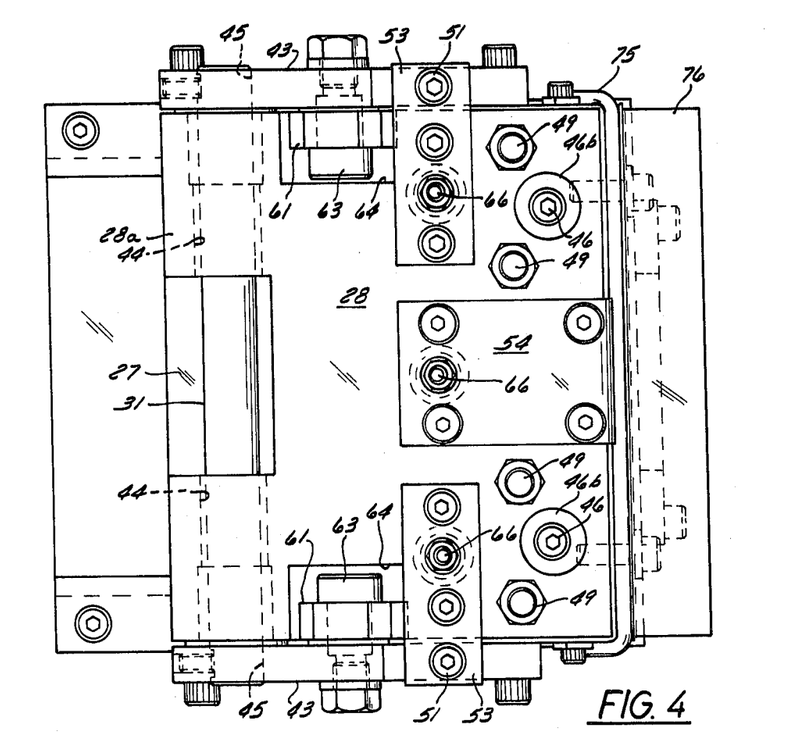
FIG. 4 is top plan view of the apparatus shown in FIG. 3, but without the pneumatic actuator and the top plate that supports it.
Figure 6:
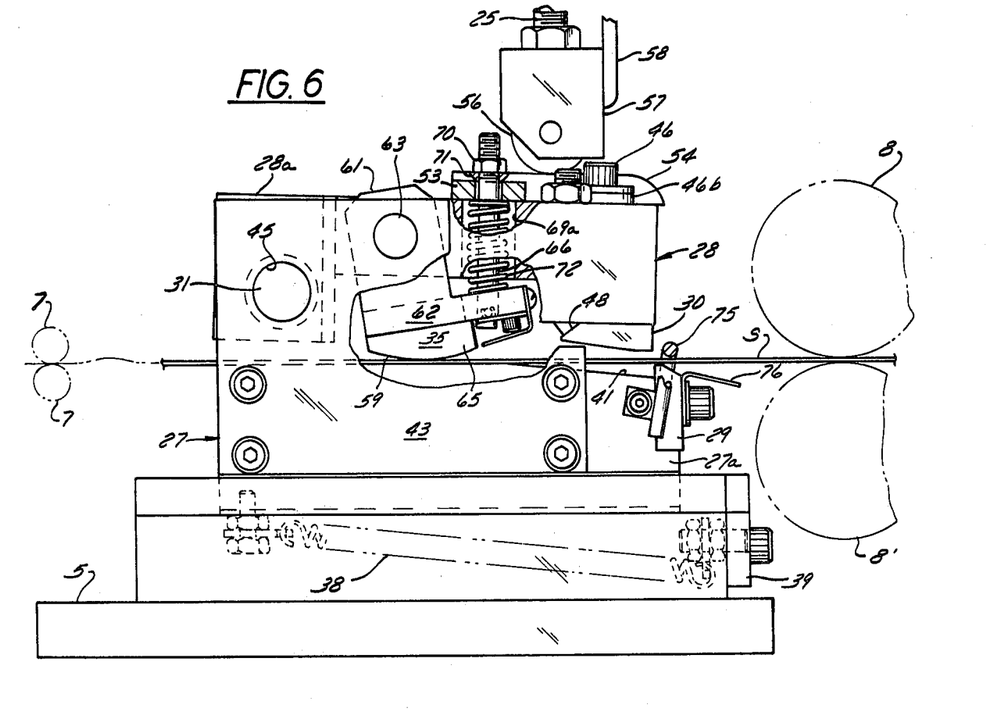
FIG. 6 is a view generally similar to FIG. 3 but showing the shearing apparatus partway into a shearing operation, at an instant when the blade carrier assembly is locked to the strip for movement with it but the upper shearing blade has not yet engaged the strip.

When the upper blade carrier 28 is in its raised position shown in FIG. 3, the tie bolts 66 cooperate with it and the gripper 35 to hold the latter in a rearward position of its swinging motion wherein the curved bottom surface 59 on the gripper is spaced above the strip. When the upper blade carrier 28 begins its descent (FIG. 6), swung down by the downwardly extending piston rod 25 of the actuator 24, the springs 72 constrain the gripper to swing forwardly in unison with downward motion of the upper blade carrier. Because the pad 65 on the gripper is spaced to the rear of the gripper axis, it moves in an oblique forward and downward direction until its curved bottom surface 59 contacts the top surface of the strip stock. Friction between the gripper and the forwardly moving strip urges the gripper farther forward and continuing descent of the upper blade carrier would allow such forward swing of the gripper, but the bottom gripper surface 59 is so curved as to wedgingly engage the strip to be substantially confined against forward swing. The strip is thus clamped between the gripper surface 59 and the clamping surface 40 on the lower blade carrier, so that the blade carrier or jaw assembly 27, 28 is effectively locked to the strip and compelled to move forward with it.

Figure 7:
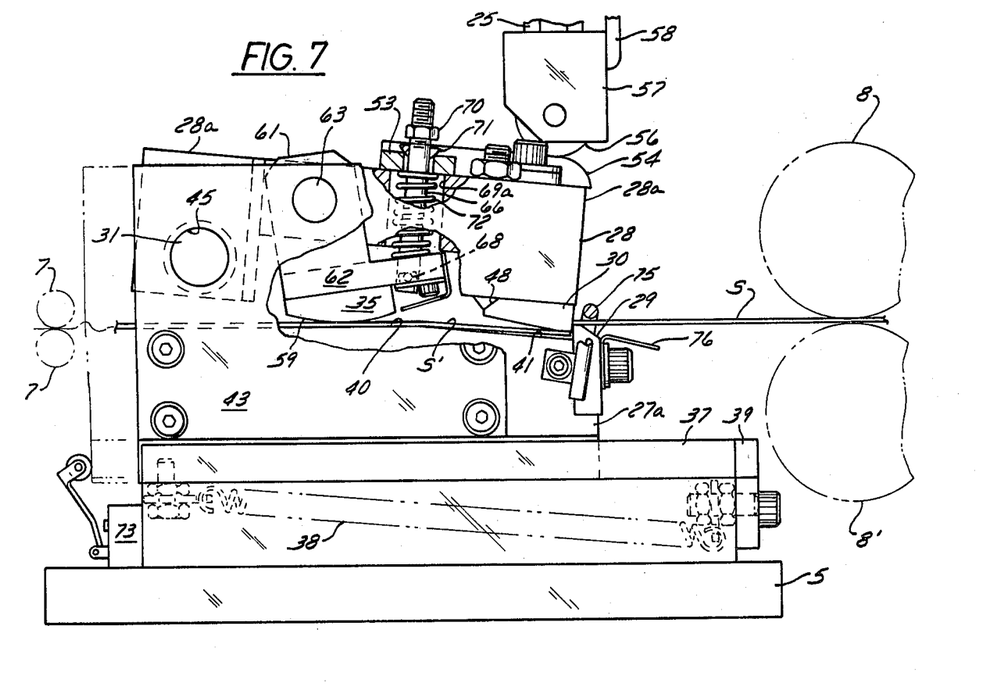
FIG. 7 is a view generally similar to FIG. 6 but illustrating a later stage of the shearing operation, at the instant when the strip is severed but before the blade carrier assembly moves out from under the actuator.

Because the tie bolts 66 provide a lost motion connection between the gripper 35 and the upper blade carrier 28, the latter can continue its descent (FIG. 7) after the carrier assembly 27, 28 is locked to the strip, compressing the springs 72 as the upper shearing blade 30 penetrates the metal. The reaction of the springs 72 against the gripper 35 increases its clamping force against the strip.

After the strip has been sheared through, the continuing forward movement of the jaw assembly 27, 28 carries it to a position in which the striker plate 54 is out from under the actuator 24, and the upper blade carrier 28 is thus released to rise under the biasing force of the springs 33. At that position, the lower blade carrier 27 engages a sensor 73, such as a microswitch or valve, that initiates retraction of the actuator piston rod 25. Until the actuator piston rod 25 retracts to some extent, it blocks rearward return movement of the jaw assembly 27, 28, but this is of no consequence. As the upper blade carrier 28 near its normal raised position, it takes up the slack in its connection with the gripper 35 through the tie bolts 66, swinging the gripper 35 rearwardly about its trunnions 63, back to its normal position in which its curved bottom surface 59 is spaced above the metal strip material. When the roller 56 on the retracting piston rod 25 is clear of the raised upper blade carrier 28, the jaw assembly 27, 28 moves rearwardly under the bias of the horizontal spring 38, back to its normal position engaging the bumper 39.

After the strip is completely cut through, and until the striker plate 54 is out from under the actuator 24, the jaw assembly 27, 28 remains clamped to the severed piece S' of the strip and moves forward with that piece at the speed imparted by the draw rollers 7. Meanwhile, the remainder of the strip will usually be advancing more slowly than the jaw assembly 27, 28, due to the slower drive of the feed rollers 8, 8'. Hence, at the instant when the jaw assembly 27, 28 is released from the severed piece S', the leading edge of the remainder of the strip will usually be spaced a little behind the shearing blades 29, 30. However, for one reason or another there might be such timing of return motions that the leading edge of the uncut strip stock would bear against the upper shearing blade 30 as it rises, and to prevent the front end of the strip from being dragged up by that shearing blade, an inverted U-shaped stripper 75 is secured to the lower blade carrier 27. The strip normally slides along under the wide bight portion of the stripper 75, which is spaced behind and above the shearing edge of the lower blade 29.

It is also possible for the leading edge of the strip to be spaced a substantial distance behind the shearing blades 29, 30 as the jaw assembly 27, 28 begins its rearward movement. In that case the unsupported front end portion of the strip may droop to some extent, especially if the strip is of light gage metal. With this possibility in mind, a downwardly and rearwardly inclined guide plate 76 is fixed to the rear of the lower blade carrier 27, for engagement under the front end portion of the strip as the jaw assembly moves rearward, to cammingly lift the strip over the top of the lower shearing blade 29.

The pneumatic actuator 24 is preferably of the double acting type. Its downward extension can be timed in any suitable manner in accordance with advance of the strip. Thus, in accordance with conventional practice in flying shears, a sensor (not shown) such as a microswitch can be adjustably positioned at a location ahead of the jaw assembly 27, 28, to respond to arrival of the leading edge of the strip at that location and issue an output which causes operation of the actuator 24. Instead of controlling retraction of the actuator piston rod 25 by means of a sensor 73, as above described, such retraction can be initiated by a timer impulse, delivered after a predetermined time interval following the output that initiates extension of the piston rod 25. The manner in which such outputs are employed to control valving of pressure air to the actuator 24 will be evident to those skilled in the pertinent art.

From the foregoing description taken with the accompanying drawings it will be apparent that this invention provides a flying shear for cutting metal strip material into accurately uniform lengths, which flying shear is unusually simple, compact and inexpensive but is nevertheless fast, efficient and trouble-free.

I claim:

1. Shearing apparatus for making a transverse cut through a strip while said strip is in lengthwise movement in a forward direction, said shearing apparatus being characterized by:
   A. a lower blade carrier confined to forward and rearward motion and having thereon an upwardly projecting lower shearing blade and an upwardly facing clamping surface;
   B. an upper blade carrier having thereon a downwardly projecting upper shearing blade cooperable with said lower shearing blade;
   C. means connecting the upper blade carrier to the lower blade carrier for up and down motion relative thereto and for forward and rearward motion in unison therewith;
   D. vertical biasing means urging the upper blade carrier to a raised position in which the shearing blades are vertically spaced apart;
   E. thrust exerting means at a relatively stationary location above the blade carriers, engageable with said upper blade carrier to force it downwardly so that said blades can shear through a strip between them;
   F. a gripper carried by the lower blade carrier for pivoting relative thereto about a gripper axis that extends transversely to said forward direction and is spaced above the level of said clamping surface, said gripper having a bottom surface curved eccentrically to said gripper axis for wedging engagement with the top surface of a strip therebeneath to clamp the strip against said clamping surface as the gripper swings forwardly about said gripper axis, thereby constraining the lower blade carrier to move forward with the strip; and
   G. link means providing a lost motion connection between said gripper and the upper blade carrier whereby movement of the latter to its raised position swings the gripper rearwardly to a normal position in which its said bottom surface is spaced substantially above said clamping surface but whereby the upper blade carrier is allowed to continue its descent after said bottom surface is engaged with a strip.

2. The shearing apparatus of claim 1, further characterized by:
   H. horizontal biasing means urging the lower blade carrier rearwardly towards a normal position.

3. The shearing apparatus of claim 1, further characterized by:
   H. spring means reacting between the upper blade carrier and the gripper to bias the latter to swing forward about said gripper axis.

4. Shearing apparatus for making transverse cuts through a strip while said strip is in lengthwise movement in a forward direction, said shearing apparatus being characterized by:
   A. strip guide and drive means for constraining a horizontally extending strip to move in a forward direction with a bottom surface of the strip at a predetermined level;
   B. a lower blade carrier confined to motion in said forward direction and in the opposite rearward direction, said lower blade carrier having
      (1) an upwardly facing clamping surface at said level and
      (2) an upwardly projecting lower shearing blade spaced behind said clamping surface;
   C. horizontal biasing means urging said lower blade carrier rearwardly to a predetermined position;
   D. an upper blade carrier having on a rear portion thereof a downwardly projecting upper shearing blade cooperable with said lower shearing blade;
   E. hinge means on front portions of said upper and lower blade carriers connecting the upper blade carrier with the lower one to move forward and backward with it and to swing up and down relative to it;
   F. vertical biasing means urging the upper blade carrier to a raised position;
   G. a gripper carried by the lower blade carrier, said gripper
      (1) being swingable backward and forward about a gripper axis spaced behind said hinge means and substantially above said level, and
      (2) having a bottom surface below said gripper axis that is curved eccentrically thereto and opposes said clamping surface;
   H. link means providing a lost motion connection between the upper blade carrier and said gripper whereby movement of the upper blade carrier to its raised position disposes the gripper in a rearwardly swung position wherein its bottom surface is spaced substantially above said level and whereby the upper blade carrier can swing down relative to the gripper as well as relative to the lower blade carrier; and
   I. an actuator at a fixed location above the blade carriers having a downwardly movable element engageable with the upper blade carrier to swing the same downwardly from its raised position.

5. The shearing apparatus of claim 4, further characterized by:
   J. a spring reacting between the upper blade carrier and the gripper in the direction to swing the latter forwardly.

6. The shearing apparatus of claim 4 wherein said bottom surface is curved on radii to the gripper axis that increase towards the rear of said surface.

7. The shearing apparatus of claim 4 wherein said lower blade carrier comprises:

(1) a block-like body having said clamping surface thereon and by which said lower shearing blade is carried, and (2) a pair of bearer plates projecting edgewise upwardly from opposite sides of said body and which support trunnions that provide said hinge means and connect the gripper with the lower blade carrier to define said gripper axis.

8. Shearing apparatus for making transverse cuts through a strip while said strip is in lengthwise movement in a forward direction, said shearing apparatus being characterized by:

A. a lower blade carrier confined to motion in said forward direction and the opposite direction and biased rearward to a predetermined position, said blade carrier having thereon
(1) an upwardly facing clamping surface and
(2) an upwardly projecting lower shearing blade;

B. an upper blade carrier connected with said lower blade carrier for forward and rearward motion therewith and for up and down motion relative thereto, said upper blade carrier being biased to a raised position;

C. a gripper having a bottom wedging surface opposingly cooperable with said clamping surface, said gripper being mounted on said lower blade carrier for limited motion relative thereto in a wedging direction that carries said bottom surface obliquely forwardly and downwardly and in an opposite releasing direction, said gripper being biased in said wedging direction;

D. an actuator at a fixed location above said blade carriers having a downwardly movable element engageable with the upper blade carrier to move the same downward from its raised position; and E. means providing a lost motion connection between said upper blade carrier and said gripper whereby the upper blade carrier can move downward independently of the gripper but movement of said upper blade carrier to its raised position moves the gripper in its releasing direction to a defined position wherein said wedging surface is spaced substantially above said clamping surface.

9. The shearing apparatus of claim 8, further characterized by:

(1) said gripper being mounted on the lower blade carrier for swinging movement about a transversely extending axis spaced a substantial distance above said clamping surface, and (2) said wedging surface being curved eccentrically to said axis on radii thereto that increase towards the rear of said surface.

* * * * *